(12) United States Patent
Edwards et al.

(10) Patent No.: US 8,634,847 B2
(45) Date of Patent: Jan. 21, 2014

(54) COMMUNICATION SYSTEM AND A MOBILE STATION, PROXY LOCATION SERVER AND METHOD OF OPERATION FOR USE IN THE SYSTEM

(75) Inventors: Mark Edwards, Reading (GB); Raul R. Carpio, Basingstoke (GB); Nanna Svane Theisen, Dragoer (DK); Christopher W. Wright, Tadley (GB); Valerie Jean Wright, legal representative, Tadley (GB); Anneke Bremner, legal representative, Eglisau (CH); Georgina Redican, legal representative, Bad Lippspringe (DE)

(73) Assignee: Motorola Solutions, Inc., Schaumburg, IL (US)

( * ) Notice: Subject to any disclaimer, the term of this patent is extended or adjusted under 35 U.S.C. 154(b) by 325 days.

(21) Appl. No.: 12/747,561

(22) PCT Filed: Dec. 8, 2008

(86) PCT No.: PCT/US2008/085850
§ 371 (c)(1),
(2), (4) Date: Dec. 30, 2010

(87) PCT Pub. No.: WO2009/079255
PCT Pub. Date: Jun. 25, 2009

(65) Prior Publication Data
US 2011/0151891 A1 Jun. 23, 2011

(30) Foreign Application Priority Data
Dec. 14, 2007 (GB) .................................... 0724390.0

(51) Int. Cl.
*H04Q 7/20* (2006.01)
(52) U.S. Cl.
USPC .................. 455/456.1; 455/456.2; 455/456.5; 455/421; 455/434; 455/418; 370/278; 370/338; 370/328; 709/203; 709/227; 709/228; 340/539.15; 340/995.16

(58) Field of Classification Search
USPC .......... 455/456.1, 456.2, 456.3, 456.4, 456.5, 455/456.6, 457, 458; 370/331, 332, 333, 370/334, 328, 338, 310.2, 33, 178; 709/203, 227, 228; 340/539.15, 995.16
See application file for complete search history.

(56) References Cited

U.S. PATENT DOCUMENTS

| 6,347,227 B1 | 2/2002 | Johansson |
| 6,868,270 B2 | 3/2005 | Dent |

(Continued)

FOREIGN PATENT DOCUMENTS

| EP | 1065904 A1 | 1/2001 |
| EP | 1677565 A2 | 1/2006 |

(Continued)

OTHER PUBLICATIONS

GB Search and Examination Report Dated Nov. 17, 2010 for Foreign Counterpart Application.

(Continued)

*Primary Examiner* — Ajit Patel
*Assistant Examiner* — Fred Casca
(74) *Attorney, Agent, or Firm* — Anthony P. Curtis; Daniel R. Bestor (57) ABSTRACT

A communication system (100) comprises a plurality of mobile stations (118, 124) each operable to communicate with other communication stations by a wireless link of a first kind, at least one location indicator (116) operable to detect by a wireless link of a second kind a location of at least one (118) of the mobile stations when the at least one mobile station is within a communication range of the location indicator, at least one proxy location server (110) operably coupled to at least one associated location indicator (116), and a location server (108) operable to communicate with the at least one proxy location server to receive a notification of the location of the at least one mobile station (118) when detected to be within communication range of the associated location indicator (116).

18 Claims, 3 Drawing Sheets

(56) References Cited

U.S. PATENT DOCUMENTS

| | | | |
|---|---|---|---|
| 6,983,312 B1 | 1/2006 | O'Neil | |
| 2001/0041577 A1 | 11/2001 | Weber et al. | |
| 2002/0164952 A1 | 11/2002 | Singhal et al. | |
| 2004/0233069 A1* | 11/2004 | Warrior et al. | 340/995.1 |
| 2005/0105496 A1* | 5/2005 | Ambrosino | 370/338 |
| 2005/0122943 A1* | 6/2005 | Hyun et al. | 370/338 |
| 2005/0130680 A1* | 6/2005 | Northcutt | 455/457 |
| 2005/0136845 A1 | 6/2005 | Masuoka et al. | |
| 2005/0136930 A1 | 6/2005 | Dent | |
| 2005/0181776 A1* | 8/2005 | Verma et al. | 455/418 |
| 2006/0030333 A1 | 2/2006 | Ward et al. | |
| 2006/0245406 A1* | 11/2006 | Shim | 370/338 |
| 2006/0291629 A1 | 12/2006 | Esh | |
| 2008/0004036 A1* | 1/2008 | Bhuta et al. | 455/456.1 |
| 2008/0147774 A1* | 6/2008 | Tummalapenta et al. | 709/202 |
| 2011/0300848 A1* | 12/2011 | Boudreau et al. | 455/419 |
| 2012/0157124 A1* | 6/2012 | Kim et al. | 455/456.2 |

FOREIGN PATENT DOCUMENTS

| | | |
|---|---|---|
| GB | 2380898 A | 4/2003 |
| KR | 20060039553 A | 5/2006 |
| WO | 02078381 A1 | 10/2002 |
| WO | 03001836 A1 | 1/2003 |
| WO | 2006025750 A1 | 3/2006 |
| WO | 2007069901 A1 | 6/2007 |

OTHER PUBLICATIONS

GB Search Report Dated Apr. 10, 2008.
PCT International Search Report Dated Mar. 4, 2009.
EPC Search and Examination Report Dated May 6, 2011 for Foreign Counterpart Application.
International Preliminary Report on Patentability and Written Opinion for counterpart International Patent Application No. PCT/US2008/085850 mailed Jun. 24, 2010.

* cited by examiner

COMMUNICATION SYSTEM AND A MOBILE STATION, PROXY LOCATION SERVER AND METHOD OF OPERATION FOR USE IN THE SYSTEM

CROSS REFERENCE TO RELATED APPLICATIONS

This application is a National Stage filing under 35 USC §371 of co-pending Patent Cooperation Treaty international application having Ser. No. PCT/US08/85850 (the "PCT international application") filed on Dec. 8, 2008. This application claims priority to the PCT international application and to prior Great Britain (GB) national application having Serial No. 0724390.0 filed on Dec. 14, 2007, the priority of which was also claimed in the PCT international application. Both the PCT international application and the GB national application are assigned to Motorola, Inc.

FIELD OF THE INVENTION

This invention relates to a communication system, particularly a mobile communication system, and a mobile station, a proxy location server and a method for use in the system.

BACKGROUND OF THE INVENTION

In the field of wireless telecommunications, it is known to equip communications devices with location determination hardware and software. Such hardware and software can either be integrated into the communications devices or provided as plug-in modules. With the decrease in cost of location determination hardware, provision of such hardware with communications devices is becoming more commonplace.

As communications devices comprising location determination hardware, for example Global Positioning System (GPS) receivers, become more commonplace, so-called location-based services and applications are becoming increasingly popular. In this respect, it can be desirable for a third party to "poll" a communications device, for example a cellular communications handset, with a location query. For example, a parent may wish to know a location of a child at a particular instant in time, an individual may want to know a location of a work colleague, or an individual may want to locate a friend.

However, at some locations, for example at a soccer match or a rock concert, a location query cannot be received or a response to the location query cannot be provided owing to a lack of network capacity. At other locations, for example in a hospital or in an aeroplane, use of wireless communications devices is simply not permitted. Likewise, at yet other locations for example a cinema or theatre, use of the wireless communications devices is undesirable. Where a response is not provided to the location query, the uncertainty accompanying the lack of response frustrates a decision as to a course of action to take based upon the location of a communications device being targeted.

In some circumstances, wireless communications devices are contactable, but ignored by their users owing to location or circumstances of the user. In this respect, some wireless communications devices have a vibrate alert setting or "silent" setting that can be selected by the user as an alternative to audible alerts provided by ring tones. In relation to Short Messaging Service (SMS) messages, or "texts", some communications devices do not vibrate to signify receipt of an SMS message. When this happens, knowing the circumstances of the user and/or providing an emergency alert to the user in emergency situations is useful.

Whilst Home Location Registers (HLRs) and Visitor Location Registers (VLRs) used in cellular communication systems, such as systems using Global Systems for Mobile communications (GSM) network protocols and Terrestrial Trunked Radio (TETRA) network protocols, may be aware of current or last known locations of wireless communications devices, such information is operationally and commercially sensitive. Release of this information to members of the public by network operators is therefore unlikely. Additionally, no Application Programming Interface (API) is available for use by a software application to access the location information from the HLR and/or VLR. Further, the level of detail provided by the HLR and/or VLR is limited to cell identities and so is of limited value, particularly as no information is provided as to when an unreachable wireless communications device might become reachable again. Also, it is highly likely that users of wireless communications devices want to limit dissemination of personal location information on privacy and/or security grounds.

SUMMARY OF THE INVENTION

According to the present invention in a first aspect, there is provided a communications system as defined in claim 1 of the accompanying claims.

According to the present invention in a second aspect, there is provided a method as defined in claim 17 of the accompanying claims.

According to the present invention in a third aspect, there is provided a mobile station as defined in claim 15 of the accompanying claims.

According to the present invention in a fourth aspect, there is provided a proxy location server as defined in claim 16 of the accompanying claims.

Further features embodying the invention are defined in the accompanying dependent claims.

BRIEF DESCRIPTION OF THE DRAWINGS

Embodiments of the invention will now be described, by way of example only, with reference to the accompanying drawings, in which.

DESCRIPTION OF EMBODIMENTS OF THE INVENTION

Throughout the following description identical reference numerals will be used to identify like parts.

Generally, in accordance with embodiments to be described, there is provided a communication system and a mobile station, proxy location server and method for use in the system. The system comprises a mobile station operable to communicate with other communication stations by a wireless link of a first kind, a location indicator operable to provide a location indication of the mobile station by establishing communication by a wireless link of a second kind with the mobile station when the mobile station and the location indicator are within a communication range of one another, a proxy location server operably coupled to the location indicator, and a location server operable to communicate with the proxy location server to receive a notification of the location of the mobile station when detected to be within communication range of the location indicator, the proxy location server being operable to receive and respond to a location query message from the location server querying location of the mobile station.

The proxy location server may be operable to provide registration of the mobile station when the location of the mobile station is detected to be within communication range of the location indicator and to provide de-registration of the mobile station when the location of the mobile station is detected to be outside the communication range of the location indicator.

The communication system may be a cellular radio system and the wireless link of the first kind may be a radio link between each mobile station and a base station of the cellular radio system serving the mobile station. The communication system may be a GSM system, a TETRA system, an APCO 25, a Universal Mobile Telecommunications System (UMTS), or a Code Division Multiple Access (CDMA) system.

The system where a cellular radio system may include an infrastructure operably coupled to or including the location server, and the location server may be operably coupled to a plurality of base stations of the system.

The wireless link of the second kind may be a short range link. Each of the mobile stations and the or each location indicator may be operable to communicate by a short range wireless link which is in accordance with a short range communication protocol standard selected from the Bluetooth™ communications standard, the WiFi (802.11) standard and the Zigbee standard.

The proxy location server may be operable to have two-way communication with the mobile station whose location has been detected by establishing communication between the mobile station and the location indicator. The mobile station may be operable to receive and display data received from the proxy location server. The mobile station may be operable to receive in response to display of the data received from the proxy location server an input signal from a user and to forward a signal to the proxy location server to indicate that the user accepts notification by the proxy location server to the location server of data relating to the detected location of the at least one mobile station. The proxy location server may be operable to notify the detected location of the at least one mobile station to the location server only after the user of the at least one mobile station has accepted the sending of the notification.

The system may include a first terminal operable to send to the location server a location query message querying a location of a second terminal which is the mobile station whose location has been detected by the location indicator and notified to the location server by the proxy location server. The first terminal may be operable to receive in response to the location query message a response message including data relating to the detected location of the second terminal.

The first terminal may be a mobile station and may be operable to send the location query message and receive the response message in radio signals communicated between the first terminal and a serving base station using a wireless link of the first kind.

The location server may be operable to send the response message to the first terminal Alternatively, or in addition, the location server may be operable to forward the location query message to the proxy location server.

The proxy location server may be operable to receive and respond to the location query message by providing information dependent upon knowledge of circumstances of unavailability of the second terminal. The proxy location server may be operable to desist from responding to the location query message on behalf of the second terminal.

The proxy location server may be operable to forward the location query message to the second terminal. The second terminal may be operable in response to receiving the location query message to generate an alert, e.g. an audible or non-audible alert, for its user.

The proxy location server may be operable to include in the response message a message provided or selected by a user of the second terminal. The message may be provided or selected by the user of the second terminal. The message may be a pre-recorded message or a message configured by the user. The message may include emergency contact details.

The proxy location server may be operable to request a user identifier and/or a password before responding to the location query message. The proxy location server may be operable to communicate an alert to the second terminal subsequent to receipt of the requested user identifier and/or password.

The proxy location server may in response to receiving the location query message be operable to determine that the first terminal is in a class of terminals permitted to receive a response to the location query.

The proxy location server may be operable to send to the second terminal a signal indicating that the location query message from the first terminal has a special priority, urgency or emergency nature. The second terminal may be operable, in response to receiving the signal, to provide an alert signal which indicates the special nature of the location query message. The second terminal, in response to receiving the signal, may be operable to vibrate in a vibration pattern indicating the special nature.

The proxy location server may be operable, in response to receipt of a location query message relating to location of a mobile station which has de-registered with the location processor, to issue in response a message indicating that the mobile station is not within range of the associated location indicator.

Figure 1:
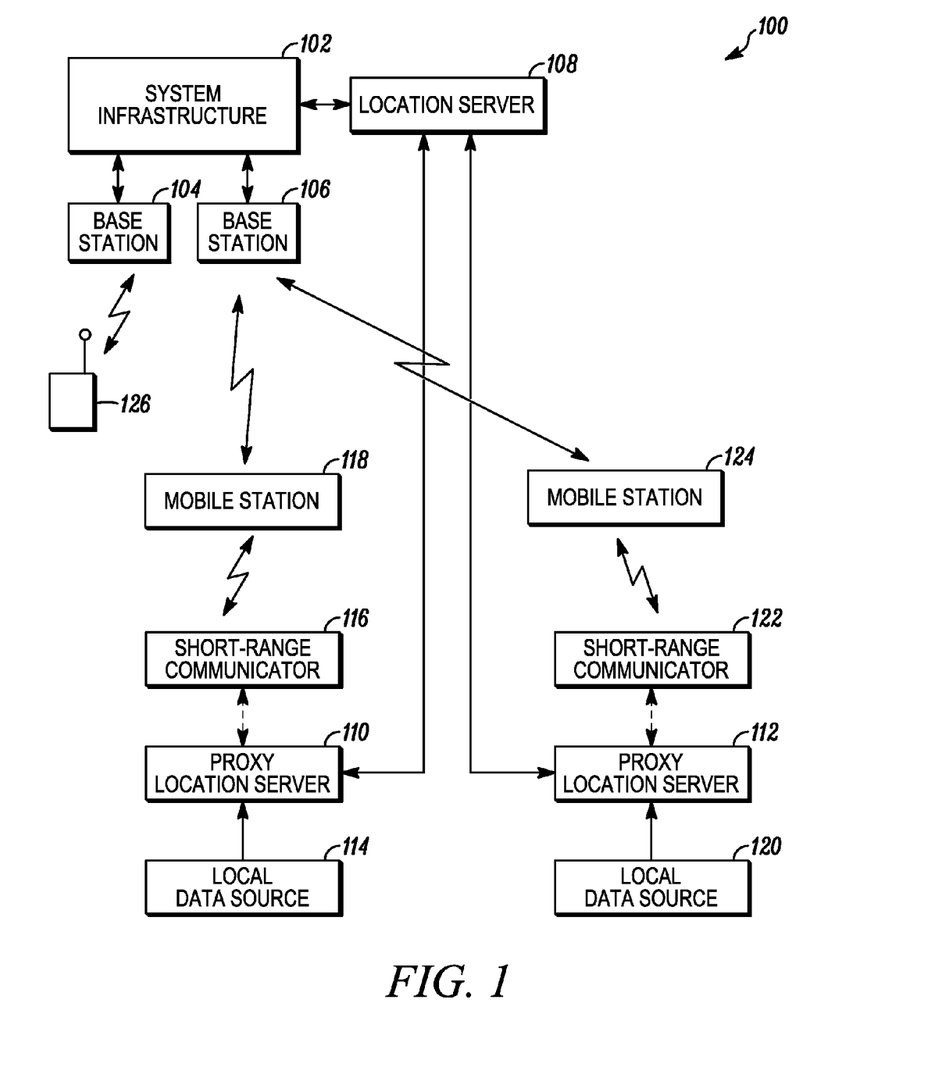
FIG. 1 is a block schematic diagram of a communication system constituting an illustrative embodiment of the invention.

Referring to FIG. 1 of the accompanying drawings, a block schematic diagram of an illustrative communication system 100 is shown. The system 100 comprises a system infrastructure 102 including a first base station 104 and a second base station 106. In this example, the system infrastructure 102 and the first and second base stations 104, 106 are part of a cellular mobile communication network. For example, the system 100 may be a system operating according to a pre-defined protocol standard known for use in a cellular system. Wireless links established in such a system are referred to herein as links of a first kind, as distinct from links of a second kind referred to later. Thus, the first kind of link is a link established using a protocol for communication between mobile stations and their serving base stations in the cellular system. The system 100 may for example be a TETRA system. In that case the first kind of link is in accordance with the TETRA standard defined by the European Telecommunications Standards Institute (ETSI). Alternatively, the system 100 may be an APCO 25 system. In that case the first kind of link is in accordance with the APCO 25 standard defined by the US Association of Public-Safety Communications Officials-International Inc. Alternatively, the system 100 may be a GSM system. In that case the first kind of link is in accordance with the GSM standard defined by ETSI. Alternatively, the link of the first kind may in accordance with a Universal Mobile Telecommunications Standard (UMTS), wherein the system 100 a is UMTS system, or a Code Division Multiple Access (CDMA) standard, wherein the system 100 is a CDMA system.

The skilled person will appreciate that the detail of the communications network and protocol employed in the system 100 is unimportant for the purpose of understanding the embodiments described herein and so, for the sake of conciseness and clarity of description, the detailed elements and operation of the system 100 will not be described in further detail herein unless directly relevant to operation of embodiments of the invention.

In order to provide a location query response service within the system 100, a location server 108 constitutes a processing resource of the system 100 and is coupled to, or incorporated within, the system infrastructure 102 of the system 100. A first proxy location server 110 and a second proxy location server 112 also constitute processors of the system 100 and are also coupled to the location server 108. Of course, the skilled person will appreciate that a greater (or fewer) number of proxy location servers can be provided in the system 100 at various geographic locations, each operable to communicate with the location server 108.

Each of the first proxy location server 110 and the second proxy location server 112 and other proxy servers of the system 100 (if any) is able to communicate with the location server 108 using a pre-defined communication protocol for such communication. The communication may use wireless links, e.g. of the kind referred to herein as the 'first kind' as described earlier. For this purpose, each of the first proxy location server 110 and the second proxy location server 112 may communicate via a neighbouring base station of the system 100, e.g. the base station 106. Alternatively, the communication with the location server 108 may be established via a wireless or wired link of another kind.

In an illustrative example, the first proxy location server 110 may be located at a boarding gate at a departure terminal of an airport (not shown) and the second proxy location server 112 may be located in a cinema (not shown).

In relation to the first proxy location server 110, a first source 114 of local data, for example a non-volatile storage device such as a non-volatile memory or a hard disc drive (HDD), is coupled to the first proxy location server 110. The first source 114 of local data is a repository of information relevant to location requests in respect of communications devices within communications range of the first proxy location server 110. In an example, manipulation of the content of the first source of local data 114 is achieved by a web service hosted by a local information technology (IT) infrastructure (not shown), the first proxy location server 110 being a client with respect to the web service. Of course, the skilled person will appreciate that other techniques to manipulate the content of the first source 114 of local data can be employed. Ownership and/or maintenance of a web service and hence data stored by the first source 114 of local data can therefore be independent of the network operator, for example an operator of the system 100 described herein. The local IT infrastructure may be, in this example, owned and/or managed by a local authority such as an airport, although the local IT infrastructure can be owned and/or managed by, for example, a hospital or a cinema where appropriate context dictates otherwise. Consequently, the data stored by the first source 114 of local data corresponds to customised information relevant to the location of the first proxy location server 110, for example flight times or film times. Of course, the type of data or information stored is related to the location of the first proxy location server 110 and storage of other types of information is therefore conceivable.

A first short-range communicator 116, e.g. a communication terminal located near the first proxy location server 110, is coupled to the first proxy location server 110 in order to indicate detection of the location of mobile communication devices, including a mobile station 118, when within communication range of the communicator 116. A wireless communication link of a second kind (as distinct from the first kind referred to earlier) to provide two-way communication with such devices including the mobile station 118 is established when such devices come within communication range of the communicator 116. The second kind of link is a short range wireless link, for example a link having a maximum range of about 400 meters. For example, the short range wireless link may be established by use of a known short range wireless communication protocol. This may for example be the protocol defined by the Bluetooth® standard. This is the open wireless communication terminal standard defined by the Bluetooth Consortium and Promotion Group. This standard is also known by the name IEEE (Institute of Electrical and Electronics Engineers) standard 802.15.1. Alternatively, the protocol of the short range link may be a Wireless Local Area network protocol in accordance with the 802.11 standard defined by the IEEE. Alternatively, the protocol may be the Zigbee™ protocol defined by the Zigbee Alliance in accordance with the 802.15.4 standard defined by the IEEE.

In an illustrative example, the mobile station 118 is also capable of communicating with the second base station 106 by a wireless communication link of the first kind referred to earlier.

In relation to the second proxy location server 112, a second source 120 of local data, for example a non-volatile storage device such as a non-volatile memory or hard disc drive (HDD), is coupled to the second proxy location server 112. The second source 120 of local data is also a repository of information to location requests in respect of communications devices within the communications range of the second proxy location server 112. In an example, manipulation of the content of the second source of local data 120 is also achieved by a web service hosted by a local IT infrastructure (not shown), the second proxy location server 112 being a client with respect to the web service. Of course, the skilled person will appreciate that other techniques to manipulate the content of the first source 114 of local data can be employed. Ownership and/or maintenance of the web service and hence the data stored by the second source of local data 120 can therefore be independent of network operators, for example the operator of the system 100 described herein. The local IT infrastructure may be, in an example, owned and/or managed by a local management authority, such as a cinema, although the local IT infrastructure can be owned and/or managed by, for example, a hospital or an airport where appropriate context dictates otherwise. Consequently, the data stored by the second source 120 of local data corresponds to customised information relevant to the location of the second proxy location server 112, for example film showing times or flight times. Of course, the type of data or information stored is related primarily to the particular location of the second proxy location server 112 and storage of other types of information is therefore possible.

A second short-range communicator 122 is coupled to the second proxy location server 110 in order to indicate detection of the location of mobile communication devices, such as a mobile station 124, when within communication range of the communicator 122, by a wireless communication link of the second kind described above and to provide two-way communication with each of such devices by the link. In an example, the mobile station 124 is also capable of communicating with the second base station 106 by a wireless communication link of the first kind described above.

Figure 2:
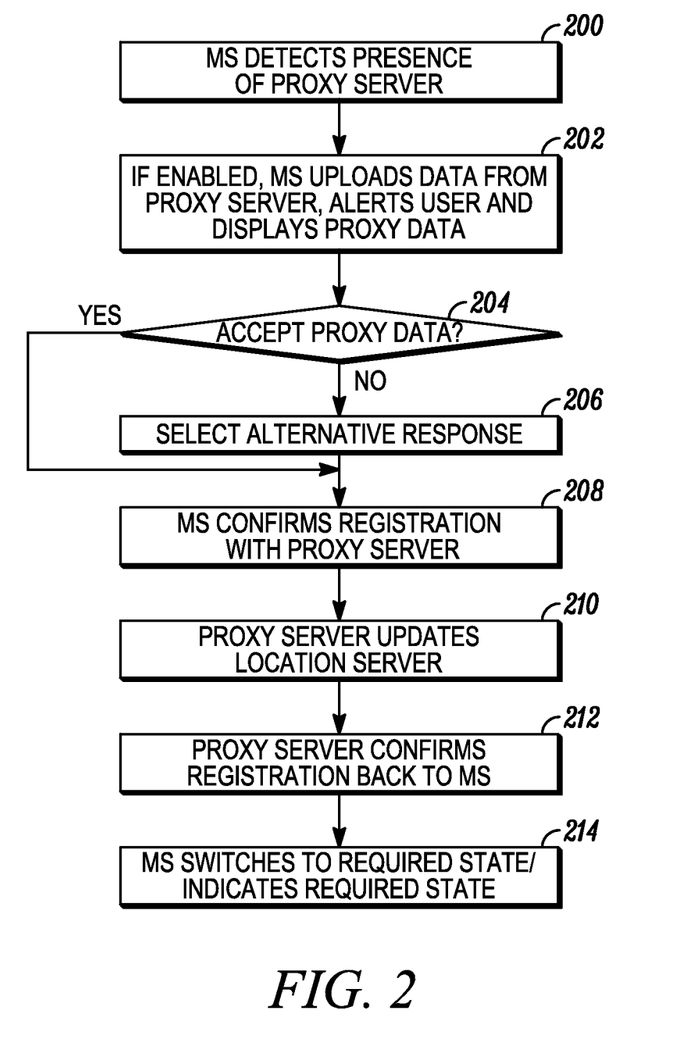
FIG. 2 is a flow diagram of a registration process used in the system of FIG. 1.

In operation, as illustrated in FIG. 2, the mobile station (MS) 118 moves into communication range of the first short-range communicator 116 and detects (Step 200) the presence of the first proxy location server 110 via the short range link with the first short-range communicator 116. The first short-range communicator 116 also detects that the mobile station is within its communication range. In this example, the first mobile station 118 is enabled to support a location query service. When the mobile station 118 and the first short range communicator 116 have each detected that they are within range of one another, the mobile station 118 uploads (Step 202) data from the first proxy location server 110 and generates an alert, such as an audible tone and displays the uploaded data once uploaded for review by a first user of the mobile station 118. The uploaded data is derived from the information stored by the first source 114 of local data that is pertinent to the location of the mobile station 118 when within range of the communicator 116. The user of the mobile station 118 is then allowed to accept or decline (Step 204) the uploaded data. If the uploaded data is declined, the user of the mobile station 118 is permitted to select (Step 206) an alternative response. Otherwise, acceptance of the uploaded data is communicated (Step 208) by the mobile station 118 to the first proxy location server 110 for implementation. The first proxy location server 110 then stores, e.g. in the first source 114 of local data 114, a selection made by the user of the mobile station 118 based upon the accepted uploaded data. The mobile station 118 then becomes registered with the first proxy location server 110, and the first proxy location server 110 notifies the location server 108 of registration by the first mobile station 118 thereby indicating the current location of the mobile station 108 to the location server 108. The proxy location server 110 thereby updates the location server 108 (Step 210), the location server 108 recording the registration in a database (not shown). Alternatively, the selection made by the user can be stored by the location server 108 without the need for the first proxy location server 110 to store the selection made. In either case, the first proxy location server 110 also confirms (Step 212) registration back to the mobile station 118 along with an indication as to any subsequent operational state that the mobile station 118 should assume. Such a state may for example include a powered-down state, a silent-alert mode, or a flight/airplane mode, depending on the location of the short-range communicator 110. Depending upon capabilities of the mobile station 118, the indication of the subsequent operational state can be implemented automatically by the mobile station 118 or communicated to the first user of the mobile station 118 as an instruction to be implemented by the first user of the mobile station 118. In response, the mobile station 118 switches to the state instructed by the first proxy location server (Step 214).

The uploaded data may be, in an example, presented as a menu driven list of options relating to possible responses to a location query from a third party based upon the location of the first proxy location server 110 that has drawn upon the information stored in the first source 114 of local data to generate the list of options. In this respect, the uploaded data can be used to generate one or more of: a default voice or textual message, enablement of default security provisions, emergency alert provisions, default enquirers to which responses are permitted, enablement of location query responses, or customisation options. A customisation option can be one or more of: an option to record a bespoke voice message, an option to record a bespoke textual message, an option to set enquirer identities and/or passwords, or emergency contact details. Of course, the above options are not all suitable for all situations and so the skilled person will appreciate that it may not be possible to implement one or more options depending upon the circumstances in question.

The second short-range communicator 122 may operate in a manner similar to the first short-range communicator 110 to detect location of the mobile station 124 when within range of the communicator 122, to allow the mobile station 124 to detect that it is within range of the communicator 122, and to provide two-way communication with the mobile station 124. The mobile station 124 operates in a manner similar to the mobile station 118. It thus carries out steps similar to steps 202 to 208 and 214. The second proxy location server 112 operates in a manner similar to that of the server 110. It thus carries out steps similar to steps 210 and 214.

Figure 3:
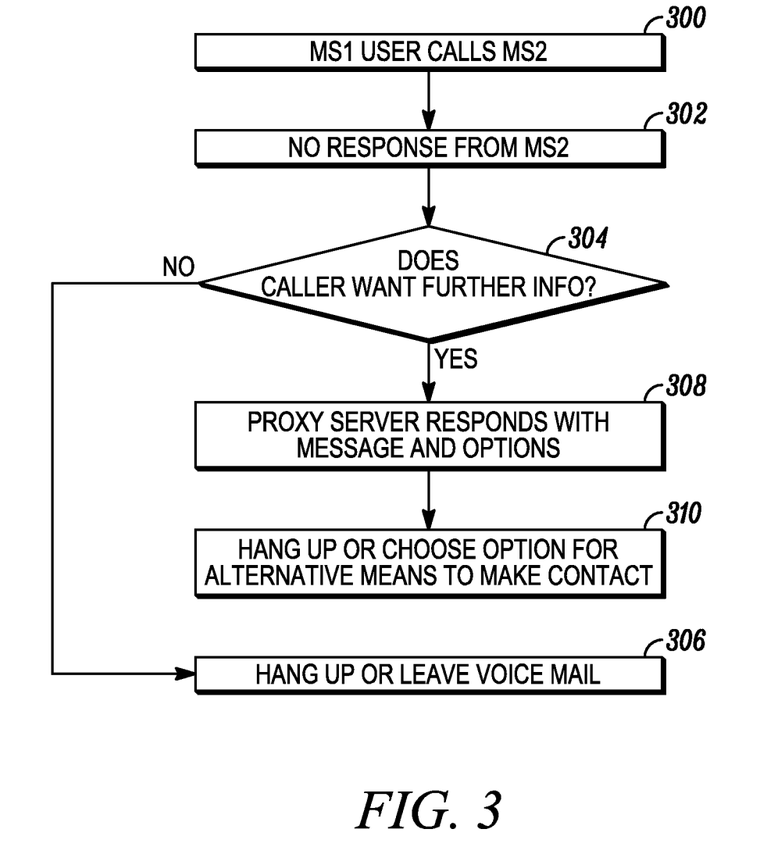
FIG. 3 is a flow diagram of a proxy location server response process used in the system of FIG. 1.

A location query process is illustrated in FIG. 3. A third party operating a communication terminal 126 (FIG. 1) needs to obtain a current location of the mobile station 118 and hence usually a current location of the user of the mobile station 118. The notation of the user terminal 126 is abbreviated in FIG. 3 to MS1 and the notation of the mobile station 118 is abbreviated in FIG. 3 to MS2. The third party uses the communication terminal 126 (MS1) to execute a location query. A location query application may be stored in a memory of the communication terminal 126 (MS1) for this purpose. Such a location query application may function in accordance with a protocol agreed in advance for implementing location querying between the communication terminal 126 (MS1) and the location server 108. In an example, the communication terminal 126 (MS1) may be a mobile station, operating in the system 100 and capable of communicating with the system infrastructure 102 via a radio link with the first base station 104 which serves the terminal 126 (MS1), i.e. a link of the first kind described earlier. However, the communications terminal 126 (MS1) can alternatively be any suitable communications terminal, wireless or wireline, capable of communicating with the location server 108, for example a Personal Computer (PC) coupled to the Internet via an Internet Service Provider (ISP).

Initially, the third party attempts to contact the user of the mobile station 118 (MS2) by calling the mobile station 118. This is represented by Step 300 in FIG. 3. The user of the mobile station 118 (MS2) has registered with the first proxy location server 110 as described earlier, and in an example has powered-down the first mobile station 118, and stopped using the mobile station 118, e.g. because the user has boarded an aeroplane (not shown) or entered a cinema not shown). When registering, the user of the mobile station 118 (MS2) may have selected a default pre-recorded message by the user to be used in relation to location queries.

As a result of the mobile station 118 (MS2) being in a powered-down state, the third party receives no response (Step 302) from the mobile station 118 (MS2). In the event that the third party is not interested in obtaining further information concerning the location of the mobile station 118 (MS2) (Step 304), the third party either hangs up or leaves a voicemail message (Step 306) when prompted to do so. Otherwise, the third party decides (Step 304) to send a location query message to the location server 108 in order to try to ascertain the location of the mobile station 118 (MS2) using the location query application stored on the communication terminal 126 (MS1). Consequently, the location query is communicated by the location query application, via the system infrastructure 102, to the location server 108. The location server 108 looks up the identity of the first proxy location server 110 with which the first mobile station 118 has registered and then communicates with the first proxy location server 110 in order to forward the location query message initiated by the communication terminal 126 (MS1) as an incoming location query. The third party constitutes the source of the incoming location query message. Alternatively, if desired, the location server 108 can be modified to ask the third party if he/she would like more information concerning the inability to contact the mobile station 118 instead of requiring the third party to initiate the location query. However, to implement such functionality account needs to be taken of the fact that information needs to be acquired by the location server 108 as to the inability of the third party to contact the mobile station 118 (MS2) directly.

The first proxy location server 110, upon receiving the location query, may look up the called party, i.e. the mobile station 118 (MS2) in this example, and determine the response option selected by the user of the mobile station 118 (MS2) by accessing the first source 114 of local data. Once identified, the selected response is implemented (Step 308). The selected response may be for the server 110 to desist from sending any response. Alternatively, in this example, the first proxy location server 110, drawing if required upon information stored by the first source 114 of local data, may construct a textual response message, such as one stating that: "Mr. X is currently on a flight and is due to arrive in New York at 22.00 hours". The textual message can, alternatively, be converted to speech using any suitable text-to-speech converter. As a further alternative, a pre-recorded message can be sent to the third party for playing by the third party. In this example, the user "Mr. X" of the mobile station 118 (MS2) is identified in the message. This information can be obtained, for example, from an electronic address book of the third party or a telephone number of the mobile station 118 (MS2) can be used instead. Indeed, in the context of a TETRA system, a so-called "alias string" can be obtained (looked-up) in an alias database (not shown) to identify the user and/or the mobile station 118 (MS2). If required, the first proxy location server 110 can permit the user of the mobile station 118 (MS2) to configure how the user of the mobile station 118 (MS2) is to be identified to the third party, for example by name or telephone number or not at all.

A response message to the third party, including any message selected by the proxy location server 110, may be sent to the third party operating the terminal 126 (MS1) either by the proxy location server 110 or, on behalf of the proxy location server 110, by the location server 108. In either case, where the terminal 126 (MS1) is a mobile station served by the base station 104, the response message may be forwarded in a radio signal by the base station 104 using a wireless link of the first kind described earlier.

Following step 308, the third party may hang up (Step 310) when the response message has been received at the terminal 126 (MS1), e.g. when the pre-recorded message has played at the terminal 126 (MS1). In the example where the pre-recorded message is played, if desired, the third party can be given a further opportunity to record a voicemail message.

In another embodiment, the second short-range communicator 122 is, in fact, a plurality of short-range communication units fitted to seats in an establishment such as a cinema or theatre, each of the plurality of short-range communications units being coupled to the second proxy location server 112. The mobile station 124, upon entering into range of a given seat in the establishment, may register with the second proxy location server 112 in the manner described earlier with reference to FIG. 2, and the user of the mobile station 124 may select a default, optionally pre-recorded, message associated with the circumstances of the establishment. The selected option may be stored in the second source 120 of local data, and the registration by the second mobile station 124 is communicated to the location server 108, the registration being recorded in the database of the location server 108.

Consequently, after attempting to telephone the user of the mobile station 124, the third party caller requests further information concerning the location of the mobile station 124 (Step 304) by initiating a location query, the location query being received by the location server 108 and forwarded to the second proxy location server 112 identified as having information concerning the location of the mobile station 124. The second proxy location server 112 retrieves the response previously selected by the user of the mobile station 124 from the second source 120 of local data and implements the selected response in response to the incoming location query received; the caller is the source of the incoming location query. The mechanisms for provision of the user options and generation of messages are as described above in relation to the previous embodiments concerning the server 110. Consequently, the second proxy location server 112 may communicate a suitable message such as: "Ms Y is at the cinema, the film ends at 20:30, but if this is an emergency please call the cinema manager on . . . ".

In yet another embodiment, the mobile station 124 (or the mobile station 118) is capable of generating a non-audible alert, for example a vibrating alert. Further, the mobile station 124 may be configured to generate a predetermined vibration pattern indicative of an emergency situation. A protocol for initiation of the predetermined vibration pattern may also be implemented in the mobile station 124 to support this feature, for example a new protocol identifier may be defined for use using a known Short Messaging Service (SMS) protocol, so that upon receipt of an SMS message containing the new protocol identifier, the emergency vibration pattern is implemented by the mobile station 124. In an example, the mobile station 124 may enable use of this feature during registration of the second mobile station 124 with the second proxy location server 112. As an optional feature, in view of the usual seriousness of the use of the emergency vibration alert, the user of the mobile station 124 can be prompted to set or select a username and/or password to permit activation of the emergency vibration alert. Such data can also be stored in the second source of local data 120.

Thus, when the second proxy location server 112 implements the selected response to the third party, the second proxy location server 112 may communicate a suitable message such as: "Ms. Y is at the cinema. Her phone is switched on and it has a vibrating SMS capability." The caller is then prompted to select communication of an emergency alert. If such an option is selected (Step 310), the caller is then prompted by the second proxy location server 112 for a username and/or password. If the username and/or password provided by the caller are/is correct, the second proxy location server 112 may send a message, e.g. an SMS message, to the mobile station 124 to initiate the emergency vibrate pattern along with a suitable alert text message to advise the user of the second mobile station 124 that the caller is trying to make contact on an urgent basis.

In a further embodiment, a police officer may be in a hospital, e.g. to take a witness statement. The first proxy location server 110 can be located at an entrance to the hospital. The mobile station 118 registering with the first proxy location server 110 may be a mobile radio handset used by the police officer. Instead of simply selecting the provision of a pre-recorded message advising callers of the location of the police officer (although this can be implemented if desired), the police officer may be provided with an option to permit an advisory message and/or alert to be sent to a third party interested in when the officer is detected to leave the hospital. Consequently, when a third party attempts to determine the location of the police officer, a pre-recorded advanced message may be played (Step 308) to the third party. For example the message may state: "This officer entered the hospital X at 11:30. Please press the # button if you would like to receive a text message alert if/when he is detected leaving the premises." The third party can then press the "#" button (Step 310) on the keypad of the terminal 126 in order to receive an alert, if desired, when the officer has left the hospital. Thereafter, the third party hangs up (Step 310).

In all of the above embodiments, a mechanism may be provided to de-register the mobile station 118 from the first proxy location server 110 and/or to de-register the mobile station 124 from the second proxy location server 112. De-registration can be achieved automatically after expiry of a time-out period and/or through use of local context, for example, if the locally stored data is updated with information pertinent to the first and/or second proxy location server 110, 112, such as knowledge that a flight has landed, or a finishing time of a film has passed. The updated information can be used as a trigger for de-registration. Alternatively, de-registration by the proxy location server 110 may be triggered by the communicator 116 detecting that the mobile station 124 is no longer within detection range (range of the short range communication) of the communicator 116.

It should by appreciated that in any of the above embodiments, the source of the incoming location query can be identified to a proxy location server, e.g. the server 110, by a user of a mobile station, e.g. the mobile station 118, registered with the server as being in a class authorised or permitted to receive a selected response from the server on behalf of the mobile station.

It is thus possible to provide a communication system and method of responding to an incoming location query that enables locations of mobile stations to be traced, especially whilst in a powered-down state, thereby providing a calling party with sufficient information to make a value judgment as to a subsequent course of action in the light of circumstances surrounding the need to contact a user of a given communications device. For example, in an emergency situation, options can be provided to enable an alternative communication to be made to follow-up an unanswered call. Additionally, users of mobile stations are encouraged to power-down their terminals or set them to a vibrate alert mode in circumstances when receipt of audible call alerts are inappropriate, because the users are comforted by the knowledge that they can still be contacted in an emergency.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A communication system comprising:
   a mobile station operable to communicate with other mobile stations via a first wireless link of a first kind between the mobile station and a communications network and with proxy location servers via a second wireless link of a second kind different from the first kind;
   a proxy location server, operably coupled to a short-range communicator and to a location server, and configured to, responsive to establishing communication by a second wireless link of the second kind with the mobile station via the short-range communicator when the mobile station and the short-range communicator are within a communication range of one another:
      upload to the mobile station one or more location-based unavailability responses associated with a location of the proxy location server that can be provided by the proxy location server upon request for a location of the mobile station from a querying terminal, and
      receive from the mobile station, in response to the upload, an indication of a selected one of the one or more location-based unavailability responses; and
   wherein the proxy location server is further configured to, responsive to one of (i) receiving the indication from the mobile station and (ii) receiving a location query message from the location server querying the location of the mobile station, provide the selected one of the one or more location-based unavailability responses to the location server.

2. A communication system according to claim 1, wherein:
   the communications network is a cellular radio system,
   the wireless link of the first kind is a cellular radio link between the mobile station and at least one base station of the cellular radio system serving the mobile station,
   the wireless link of the second kind is a short range wireless link between the mobile station and the short-range communicator; and
   the proxy location server is coupled to a base station of the cellular radio system and is configured to communicate via a third wireless link of the first kind between the proxy location server and the base station.

3. A communication system according to claim 2, wherein the proxy location server and the location server are operably coupled and are each configured to communicate by a wireless link of the first kind.

4. A communication system according to claim 1, wherein:
the mobile station is configured to register with the proxy location server when the location of the mobile station is detected to be within the communication range of the short-range communicator and to de-register with the proxy location server when the location of the mobile station is detected to be outside the communication range of the short-range communicator; and
wherein the proxy location server is configured to send notifications of the registration and de-registration of the mobile station to the location server.

5. A communication system according to claim 1, further comprising:
a querying terminal configured to send to the location server a location query message querying a location of the mobile station,
wherein the querying terminal is configured to receive, in response to the location query message, the selected one of the one or more location-based unavailability responses.

6. A communication system according to claim 5, wherein the proxy location server is configured to receive the location query message and to respond to the location query message by indicating, upon detecting that the mobile station has de-registered, that the mobile station is no longer within a communication range of the associated location indicator, or to desist from responding to the location query message on behalf of the mobile station.

7. A communication system according to claim 6, wherein the proxy location server is configured, before responding to the location query message, to (i) request at least one of a user identifier or a password from the querying terminal, or (ii) determine that the querying terminal is in a class of terminals permitted to receive the selected one of the one or more location-based unavailability responses.

8. A communication system according to claim 6 wherein:
the proxy location server is configured to send to the mobile station a priority signal indicating a location query message from the querying terminal that has a special nature including a special priority, a special urgency or an emergency nature; and
the mobile station is configured, in response to receiving the priority signal, to provide an alert signal that indicates the special nature of the location query message.

9. A communication system according to claim 1, wherein the proxy location server is configured to upload to the mobile station a plurality of location-based unavailability responses associated with the location of the proxy location server that can be provided by the proxy location server upon request for a location of the mobile station from a querying terminal, and to receive an indication of a selected one of the plurality of location-based unavailability responses from the mobile station.

10. A communication system according to claim 9, wherein:
the proxy location server is configured to receive the location query message from the querying terminal and to include in a response message to the querying terminal the selected one of the plurality of location-based unavailability responses.

11. A communication system according to claim 9, wherein:
the proxy location server is configured to, in response to receiving the indication of the selected one of the plurality of location-based unavailability responses from the mobile station, provide a confirmation registration back to the mobile station and include in the confirmation registration an indication of a subsequent operational state that the mobile station should assume.

12. A communication system according to claim 11, wherein the subsequent operational state is one of a powered-off state, a silent-alert state, and an airplane mode state.

13. A method of operation of a communication system having a mobile station that is operable to communicate with other communication stations by a wireless link of a first kind between the mobile station and a communications network, a location server, a proxy location server, and a short-range communicator coupled to the proxy location server, the method comprising:
the proxy location server, responsive to detecting, via the short-range communicator, that the mobile station is within communication range of the short-range communicator and establishing communication with the mobile station by a wireless link of a second kind, different from the first kind, via the short-range communicator:
uploading to the mobile station one or more location-based unavailability responses associated with a location of the proxy location server that can be provided by the proxy location server upon request for a location of the mobile station from a querying terminal, and
receiving from the mobile station, in response to the uploading, an indication of a selected one of the one or more location-based unavailability responses, and
the proxy location server, responsive to one of (i) receiving the indication from the mobile station and (ii) receiving a location query message from the location server querying the location of the mobile station, provide the selected one of the one or more location-based unavailability responses of the location server.

14. A method according to claim 13, further comprising a querying terminal:
sending to the location server the location query message querying the location of the mobile station, and
receiving in response to the location query message the selected one of the one or more location-based unavailability responses.

15. A method according to claim 13, the method further comprising:
the proxy location server uploading to the mobile station a plurality of location-based unavailability responses associated with the location of the proxy location server that can be provided by the proxy location server upon request for a location of the mobile station from a querying terminal, and receiving an indication of a selected one of the plurality of location-based unavailability responses from the mobile station.

16. A method according to claim 15, the method further comprising:
the proxy location server receiving the location query message from the querying terminal and including in a response message to the querying terminal the selected one of the plurality of location-based unavailability responses.

17. A method according to claim 15, the method further comprising:
the proxy location server, in response to receiving the indication of the selected one of the plurality of location-based unavailability responses from the mobile station, providing a confirmation registration back to the mobile station and including in the confirmation registration an indication of a subsequent operational state that the mobile station should assume.

18. A method according to claim 17, wherein the subsequent operational state is one of a powered-off state, a silent-alert state, and an airplane mode state.

* * * * *